United States Patent
Guo et al.

(10) Patent No.: US 9,426,237 B2
(45) Date of Patent: *Aug. 23, 2016

(54) WEB NAVIGATION USING WEB NAVIGATION PATTERN HISTORIES

(71) Applicant: International Business Machines Corporation, Armonk, NY (US)

(72) Inventors: Shang Q. Guo, Cortland Manor, NY (US); Sinem Guven Kaya, New York, NY (US); Larisa Shwartz, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/687,136

(22) Filed: Nov. 28, 2012

(65) Prior Publication Data

US 2014/0122660 A1    May 1, 2014

Related U.S. Application Data

(63) Continuation of application No. 13/664,811, filed on Oct. 31, 2012.

(51) Int. Cl.
  *G06F 15/16* (2006.01)
  *H04L 29/08* (2006.01)
  *G06F 17/30* (2006.01)

(52) U.S. Cl.
  CPC .......... *H04L 67/22* (2013.01); *G06F 17/30873* (2013.01)

(58) Field of Classification Search
  None
  See application file for complete search history.

(56) References Cited

U.S. PATENT DOCUMENTS

| | | |
|---|---|---|
| 6,023,701 A | 2/2000 | Malik et al. |
| 6,928,474 B2 | 8/2005 | Venkatesan |
| 6,993,586 B2 | 1/2006 | Chen et al. |
| 7,614,004 B2 | 11/2009 | Milic-Frayling et al. |
| 7,979,544 B2 * | 7/2011 | Cancel et al. ................. 709/224 |
| 8,140,579 B2 | 3/2012 | Li et al. |
| 8,744,988 B1 * | 6/2014 | Hamon ........................... 706/45 |
| 2002/0040311 A1 * | 4/2002 | Douglass et al. .................. 705/7 |
| 2004/0083127 A1 * | 4/2004 | Lunsford et al. ................ 705/10 |

(Continued)

OTHER PUBLICATIONS

Keller et al.; "Beyond The Web Graph: Mining . . . With Navigation Structure Graphs", EIDWT IEEE International Conference on, Sep. 7-9, 2011, pp. 99-106.

(Continued)

*Primary Examiner* — Melvin H Pollack
*Assistant Examiner* — Oluwatosin Gidado
(74) *Attorney, Agent, or Firm* — Ryan, Mason & Lewis, LLP

(57) ABSTRACT

Web navigation pattern histories are used to navigate to a plurality of visited web sites. A navigation map is generated comprised of a node for each visited web site. Each node in the navigation map is connected by an edge to at least one other node in the navigation map, and the edge is associated with the link from the given visited web site to the next web site. For each visited web site, the corresponding node stores an address for the given web site, a relevance rating for the given visited web site, a link from the given visited web site to a next web site and optionally a title of the web site. A presentation of a node in the navigation map is based on the relevance rating. A plurality of navigation maps for a plurality of users can be merged by identifying navigation maps having similar search goals.

18 Claims, 7 Drawing Sheets

(56) References Cited

U.S. PATENT DOCUMENTS

| | | |
|---|---|---|
| 2009/0055369 A1* | 2/2009 | Phillips et al. .................... 707/4 |
| 2009/0132524 A1 | 5/2009 | Stouffer et al. |
| 2009/0210827 A1 | 8/2009 | Brugler et al. |
| 2010/0114908 A1 | 5/2010 | Chand et al. |
| 2011/0087966 A1 | 4/2011 | Leviathan |
| 2011/0289161 A1* | 11/2011 | Rankin et al. ................ 709/206 |
| 2012/0066645 A1 | 3/2012 | Laurie et al. |
| 2013/0007587 A1* | 1/2013 | Marantz ............ G06F 17/30867 715/234 |
| 2013/0159824 A1* | 6/2013 | Barak et al. ................... 715/205 |

OTHER PUBLICATIONS

IP.com et al.; "A Method for Web Browser to Ease Regular Patterns of Navigation Between Webpages", IPCOM000205176D, Mar. 18, 2011, pp. 1-3.

* cited by examiner

FIG. 2    ↙200

For each web page that is visited, if (the page has been visited)
then
  Retrieve Node from Map
else
  creates node for new page and Add to Map,
end if Save the Following Information to the Node,
Page URL,
Title of the page,
Notes/Annotations that user Creates for Page,
Time Stamp of Page Load,
Hypertext Link that user clicks to go to next page,
Signature Sentences/Paragraphs about the Hypertext Link, Create an Edge Starting from Node, Associate URL of the Hypertext (for next page) to the Edge.

if user saves local copy of page, such as PDF or image, save local copy and location of the file is saved to the node in the map.

Each node in map can have multiple containers for storing multiple visits.

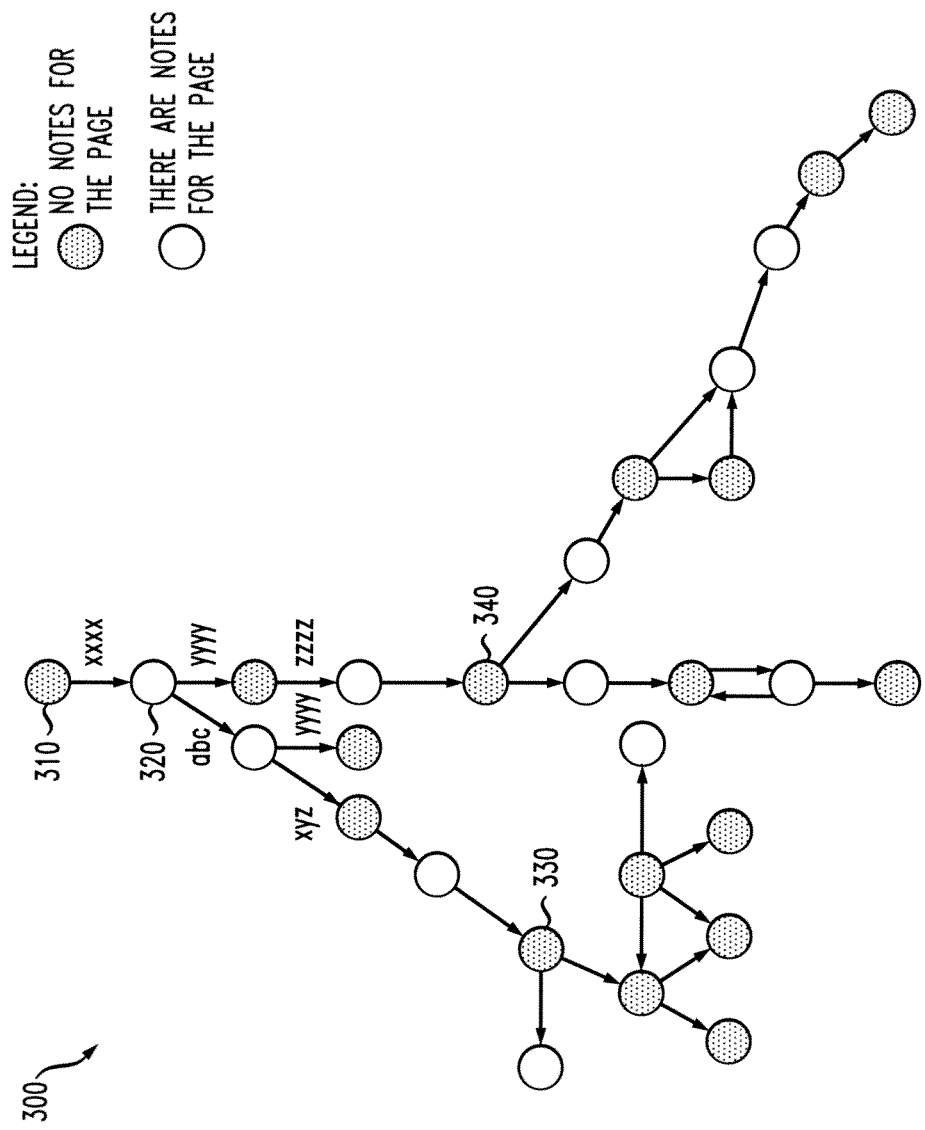

US 9,426,237 B2

WEB NAVIGATION USING WEB NAVIGATION PATTERN HISTORIES

CROSS-REFERENCE TO RELATED APPLICATION

This application is a continuation of U.S. patent application Ser. No. 13/664,811, filed Oct. 31, 2012, incorporated by reference herein.

The present application is related to U.S. Patent Application entitled "Web Navigation Tracing," filed Oct. 31, 2012 and incorporated by reference herein.

FIELD OF THE INVENTION

The present invention relates generally to the electrical, electronic and computer arts, and, more particularly, to improved techniques for web navigation of relevant information.

BACKGROUND OF THE INVENTION

When a user is searching web sites for particular information, the user typically follows several links, from one web page to another, until the user finds the desired information or decides to search with different criteria. During the search and navigation processes, some of the encountered web pages are more relevant than others.

Some links that are followed take the user to other relevant information. Meanwhile, other links take the user away from the relevant information, possibly resulting in the user having to abandon the search and start all over again.

A need therefore exists for methods and apparatus for web navigation that limit the navigation space to relevant web pages (or other web resources). In this manner, the user can reach the target information faster.

SUMMARY OF THE INVENTION

Generally, methods and apparatus are provided for improved web navigation using web navigation pattern histories. According to one aspect of the invention, a navigation by a user to a plurality of visited web sites is traced and a navigation map is generated. The navigation map is comprised of a node for each visited web site, wherein each node in the navigation map is connected by an edge to at least one other node in the navigation map, wherein the edge is associated with the link from the given visited web site to the next web site. For each visited web site, the corresponding node stores an address for the given web site, a relevance rating for the given visited web site, a link from the given visited web site to a next web site and optionally a title of the web site. A keyword search of the nodes can be processed to identify the given web site in the navigation map.

A presentation of at least one node in the navigation map is based on the relevance rating. For example, the presentation can comprise a visual indication of the relevance rating. The presentation may also comprise selectively including or excluding one or more nodes in the navigation map based on the relevance rating. In addition, one or more navigation links may be selectively enabled or disabled based on the relevance rating. One or more bypass links are optionally added to the navigation map based on the relevance rating.

According to another aspect of the invention, a navigation map can be designated as a public navigation map and the navigation map can be made available to at least one other user. A plurality of navigation maps for a plurality of users can be merged. The plurality of navigation maps can be merged by identifying navigation maps having similar search goals and merging the identified navigation maps from a common point by identifying nodes in the identified navigation maps corresponding to a same web page and rooting a common node of a first of the identified navigation maps to a corresponding common node of a second of the identified navigation maps. A relevance rating for a node in the merged navigation map can be determined based on one or more conflict resolution rules to resolve conflicting relevance ratings by different users.

A more complete understanding of the present invention, as well as further features and advantages of the present invention, will be obtained by reference to the following detailed description and drawings.

BRIEF DESCRIPTION OF THE DRAWINGS

FIG. 2 illustrates exemplary pseudo code for a navigation map generation process that incorporates aspects of the present invention;

FIG. 3 illustrates another navigation map incorporating aspects of the present invention;

DETAILED DESCRIPTION OF PREFERRED EMBODIMENTS

Aspects of the present invention provide methods and apparatus for improved web navigation that limit the navigation space to relevant web pages (or other web resources). According to one embodiment of the invention, a web navigation tool is provided that automatically determines a relevant navigation space given the target information and the historic navigation patterns of users to reach the target information, and then restricts the future navigation links to relevant navigation links. In this manner, the navigation space is focused on relevant information and the user can reach the target information faster.

An exemplary embodiment of the disclosed web navigation tool 700, as discussed further below in conjunction with FIG. 7, extends the exemplary web navigation tracing tool described in U.S. Patent Application entitled "Web Navigation Tracing," filed contemporaneously herewith and incorporated by reference herein. The disclosed web navigation tool generates relevance-based navigation maps that filter navigation maps that allow a user to return to specific previously visited resources, make notes or highlight things of interest, find new locations where previously visited pages have been relocated (e.g., if a previously visited page is moved to a new address or location), and/or provide a surfing history hierarchy. Generally, as discussed hereinafter, as a user traverses web resources page by page, the web navigation tool automatically creates a "navigation map" storing certain information for each visited web page. The information stored in the navigation map for each visited web page can include, for example, metadata about the visited page, as well as user notes or highlights about the visited page. The navigation map can then be filtered in accordance with the present invention based on a relevance rating of each node in the map.

As the navigation map is generated, the links get rated for relevance during navigation. The relevance rating can be provided by the user for each visited web site, or the relevance rating could be discovered automatically by analyzing the navigation map itself. For example, if the analysis shows that a given web page is almost always visited by different users just prior to reaching the target page, that given web page can be inferred to relevant to the user's goal of reaching the target irrespective of whether someone explicitly marked it as useful. The relevance ratings can replace explicit online rating systems. One aspect of the present invention filters the generated navigation map to present relevant navigation links based on a determined relevant navigation space, given the target information, and the historic navigation patterns of users to reach the target information.

Figure 1:
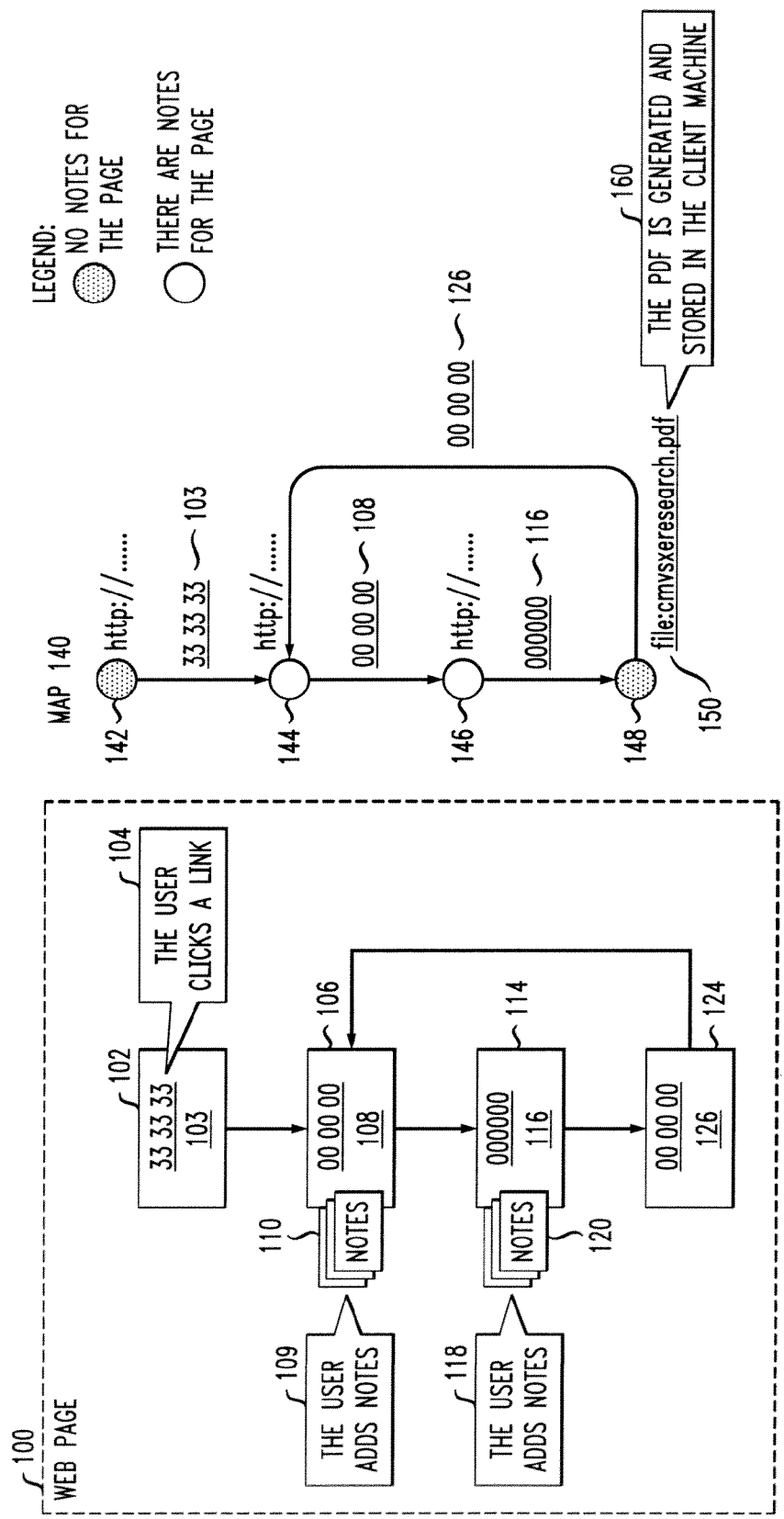
FIG. 1 illustrates an exemplary web browsing session to which the present invention can be applied.

FIG. 1 illustrates an exemplary web browsing session 100 to which the present invention can be applied. It is noted that the exemplary web browsing session 100 for a given user can occur over one or more intervals of time and occur using different computing devices (not shown) of the given user. As shown in FIG. 1, the exemplary web browsing session 100 comprises a user visiting a first web page 102 containing a link 103 which the user selects at a time 104. The link 103 brings the user to a second web page 106 having a link 108. While browsing the second web page 106 the user enters notes 110 at a time 109. When the user selects the link 108, the browser brings the user to a third web page 114 having a link 116. While browsing the third web page 114 the user enters notes 120 at a time 118. When the user selects the link 116, the browser brings the user to a fourth web page 124 having a link 126. When the user selects the link 126, the browser returns the user to the second web page 106.

A navigation map 140 is created for the exemplary web browsing session 100. Exemplary pseudo code for generating the navigation map 140 is discussed further below in conjunction with FIG. 2. The exemplary navigation map 140 indicates how the user gets to a given web page from the beginning of the browsing session 100. The exemplary navigation map 140 records the navigation process and contains information about each visited page and a transition trigger from one page to a subsequent page. In this manner, the user can trace back at any time to an earlier visited web page.

As shown in FIG. 1, the navigation map 140 comprises a node 142 corresponding to the user visit to the first web page 102, a second node 144 corresponding to the user visit to the second web page 106, a third node 146 corresponding to the user visit to the third web page 114, and a fourth node 148 corresponding to the user visit to the fourth web page 124. Each node 142, 144, 146, 148 represents a web page 102, 106, 114, 124, respectively, and is connected to a subsequent web page by an edge having a corresponding link 103, 108, 116, 126 that was used to navigate to the subsequent web page 102, 106, 114, 124. As indicated by the legend of FIG. 1, each node 142, 144, 146, 148 can optionally visually indicate whether there are user notes associated with the corresponding web page 102, 106, 114, 124.

In addition, according to a further aspect of the invention, discussed further below, the user can optionally generate PDF or another version of a visited web site and store it as part of the navigation map 140. For example, as shown in FIG. 1, when the user visits the fourth web page 124, the user can generate and store a PDF version of the web page 124 and a file identifier 150 indicating the location of the stored PDF can be included in the node 148 of the navigation map 140 associated with the web site 124.

The exemplary map 140 is presented as a directed graph, with each node representing a web page, and a label is associated with an edge out of the node is the hypertext link that is clicked to access the next web page (or next node in the map 140).

FIG. 2 illustrates exemplary pseudo code for a navigation map generation process 200 that incorporates aspects of the present invention. As shown in FIG. 2, for each visited web page, the exemplary navigation map generation process 200 determines if the web page has been visited. If the web page has been visited, then the navigation map generation process 200 retrieves the corresponding node from the navigation map 140. If the web page has not been visited, then the navigation map generation process 200 creates a new node in the navigation map 140 for the new page.

For each web site visit, the exemplary navigation map generation process 200 saves the following information to the node:
 (i) page URL;
 (ii) title of the page;
 (iii) notes/annotations that user creates for page;
 (iv) time stamp of page load;
 (v) hypertext link that user clicks to go to next page; and
 (vi) signature sentences/paragraphs about the hypertext link.

In addition, the exemplary navigation map generation process 200 creates an edge starting from the given node and associates the URL of the hypertext link (for the next page) to the edge. As discussed further below in conjunction with FIGS. 4-6, the exemplary navigation map generation process 200 of FIG. 2 can also save a relevance score or rating for each node in accordance with an aspect of the present invention. During navigation, if the user feels a particular web page is relevant, or the user may want to visit the web page again after following other links first, the user marks the page or annotates the page as relevant. If a page is irrelevant, the user can also mark the page as irrelevant.

If the user saves a local copy of the visited web page, such as a PDF or an image of the web page, the local copy is saved and the location of the file is saved to field 150 of the node in the navigation map 140. It is noted that in an exemplary embodiment, each node in the navigation map 140 can have multiple containers for storing multiple visits to the same web page (each uniquely identified by a time stamp).

The signature sentence(s) can also be used to validate an article returned by the URL link stored in the map 140. If the returned article does not match with the stored signature or the URL is broken, the signature sentence is used to search the Internet using, for example, a search engine. Once the new location is identified, the link of the node in the map 140 can be updated. The signature sentences/paragraphs can be selected by the system automatically, for example, using one or more paragraphs near the selected hypertext.

FIG. 3 illustrates another navigation map 300 incorporating aspects of the present invention. The exemplary navigation map 300 indicates how the user gets to a given web page from the beginning of the browsing session indicated by initial node 310. The exemplary navigation map 300 records the navigation process and contains information about each visited page and a transition trigger from one page to a subsequent page, in a similar manner to the navigation map 140 of FIG. 1.

As shown in FIG. 3, the navigation map 300 comprises a number of branch nodes, such as nodes 320, 330, 340, corresponding to pages that a user initially left and returned to before navigating to a different page (during the same or a different navigation session). Each node, such as nodes 310, 320, 330, 340 represents a visited web page, and is connected to a subsequent web page by an edge having a corresponding link that was used to navigate to the subsequent web page. Arrows 350 and 360 indicate an entry into a corresponding node within the navigation map 300 at the start of a new navigation session.

According to a further aspect of the invention, a map 140, 300 can be designated as a public map that can be published by a server so subscribers of a service could use it. A public map can be downloaded, updated, retrieved and/or searched by multiple users. In one exemplary implementation, the map 140 is stored in the server's data store in the same way it is stored on the client without versioning support. In this case, a Publish service stores the information for each navigation map 140 in the data store without any references to any other possible versions or original ownership (created by).

In a further variation, subscribers can be provided with additional information on the navigation maps 140 such as previously published versions (parents/descendants) of this map 140 and their ownership. The differences relative to a prior version can be stored in the data store together with the reference to the parent map. In this manner, the maps can be composed from various versions of the same base map, thereby facilitating more efficient usage of storage.

According to an aspect of the present invention, the exemplary navigation map generation process 200 of FIG. 2 can also save a relevance score or rating for each node in the map 140, 300. As discussed hereinafter, the relevance ratings can be used to further annotate, filter and process the navigation map 300 of FIG. 3.

Figure 4:
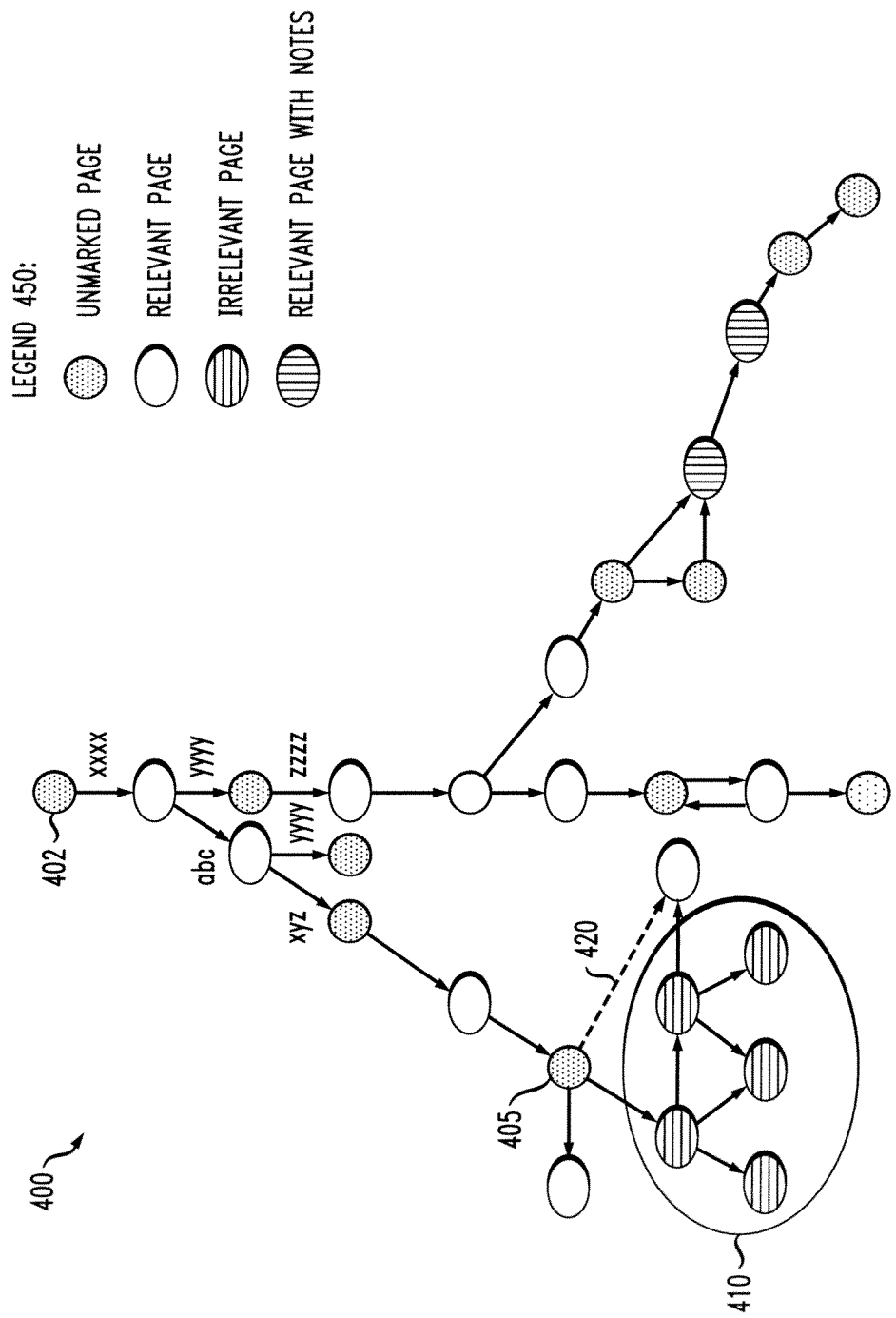
FIG. 4 illustrates yet another navigation map incorporating further relevance aspects of the invention.

FIG. 4 illustrates a navigation map 400 incorporating relevance aspects of the present invention. The exemplary navigation map 400 indicates how the user gets to a given web page from the beginning of the browsing session indicated by initial node 402. The exemplary navigation map 400 records the navigation process and contains information about each visited page and a transition trigger from one page to a subsequent page, in a similar manner to the navigation map 300 of FIG. 3.

As shown in FIG. 4, the navigation map 400 comprises a number of nodes. Each node in the map 400 represents a visited web page, and is connected to a subsequent web page by an edge having a corresponding link that was used to navigate to the subsequent web page, in a similar manner to FIG. 3. In addition, one or more nodes in the navigation map 400 have an associated relevance rating. In the exemplary embodiment of FIG. 4, as shown by the legend 450, a given node can have an associated relevance rating of unmarked page (i.e., no relevance rating provided); relevant page; irrelevant page; or relevant page with notes.

The exemplary navigation map 400 of FIG. 4 comprises a cluster or set 410 of irrelevant pages. The user can optionally selectively configure whether the links associated with the irrelevant nodes 410 are enabled or disabled in the map 400, as well as in the corresponding web pages. For example, the web page associated with source node 405 comprises one or more links directly or indirectly to a number of web pages associated with the irrelevant nodes 410. The irrelevant links on the web page associated with node 405 can be selectively disabled in accordance with an aspect of the invention to prevent the user from following the irrelevant links. In addition, the irrelevant nodes 410 can optionally be hidden in the exemplary navigation map 400 of FIG. 4.

According to a further aspect of the invention, a new bypass hyperlink 420 can optionally be added to the map 400, as well as to the corresponding web page associated with the source node 405 to bypass a set 410 of irrelevant nodes/links.

In this manner, as users publish their navigation maps, the disclosed web navigation tool 700 analyzes the published navigation maps and identifies any patterns in navigation that lead to target information. The disclosed web navigation tool 700 determines which (irrelevant) links should be disabled for future users performing the same or similar search to optimize their navigation. The irrelevant links could be hidden or displayed but highlighted differently from the relevant links to indicate their relevance level, for example, using a toggle that enables or disables irrelevant links. The modified navigation map 400 with disabled irrelevant links would help the user to avoid visiting the irrelevant nodes 410 and potentially navigating to irrelevant web pages.

Another aspect of the invention merges the optimized maps of a plurality of users for faster target acquisition. If navigation maps are optimized and merged, another user searching for the same or similar information can get the desired information faster by using the merged map. The merged map leverages past searches and ratings of fellow users that evaluate overlapping or disjoint search spaces.

Figure 5:
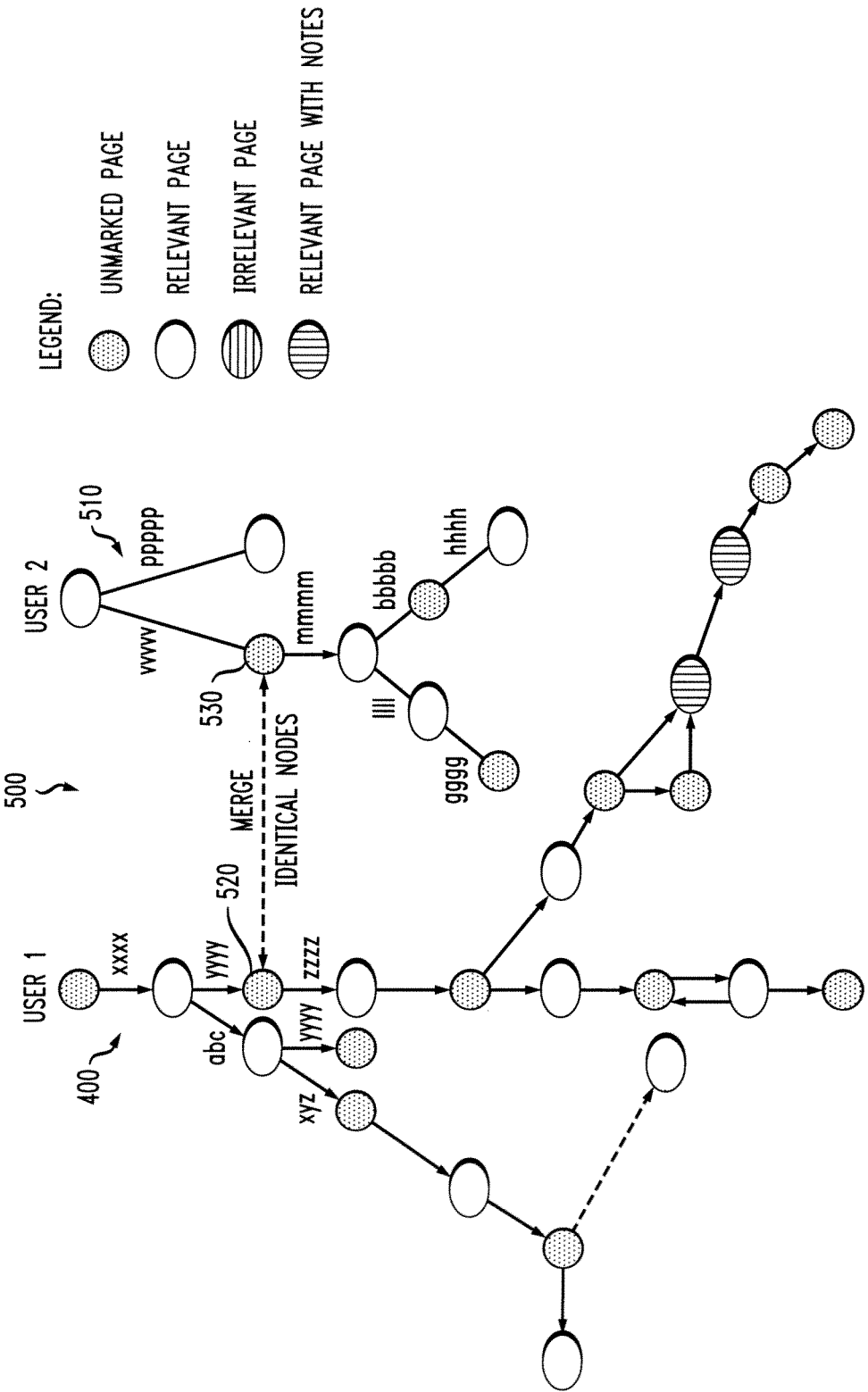
FIGS. 5 and 6 illustrate the merging of a first navigation map of a first user and a second navigation map of a second user.

FIG. 5 illustrates a merging 500 of a navigation map of a first user, such as the navigation map 400 of FIG. 4, and a second navigation map 510 of a second user. Generally, the merging process 500 recognizes similar search goals for two or more maps and merges the maps from a common point by identifying nodes in the maps 400, 510 of a plurality of users corresponding to the same web page, and roots the common node of the smaller map to the corresponding common node of the larger map.

For example, consider a first user that performs a web search for the phrase "Lotus email archive" and a second user that performs a web search for the phrase "how to archive email for Lotus Notes." During the navigation session, the first user navigates one or more links and reaches the page corresponding to node 520 in the map 400. Likewise, during the navigation session, the second user navigates one or more links and reaches the same web page corresponding to node 530 in the map 510.

Figure 6:
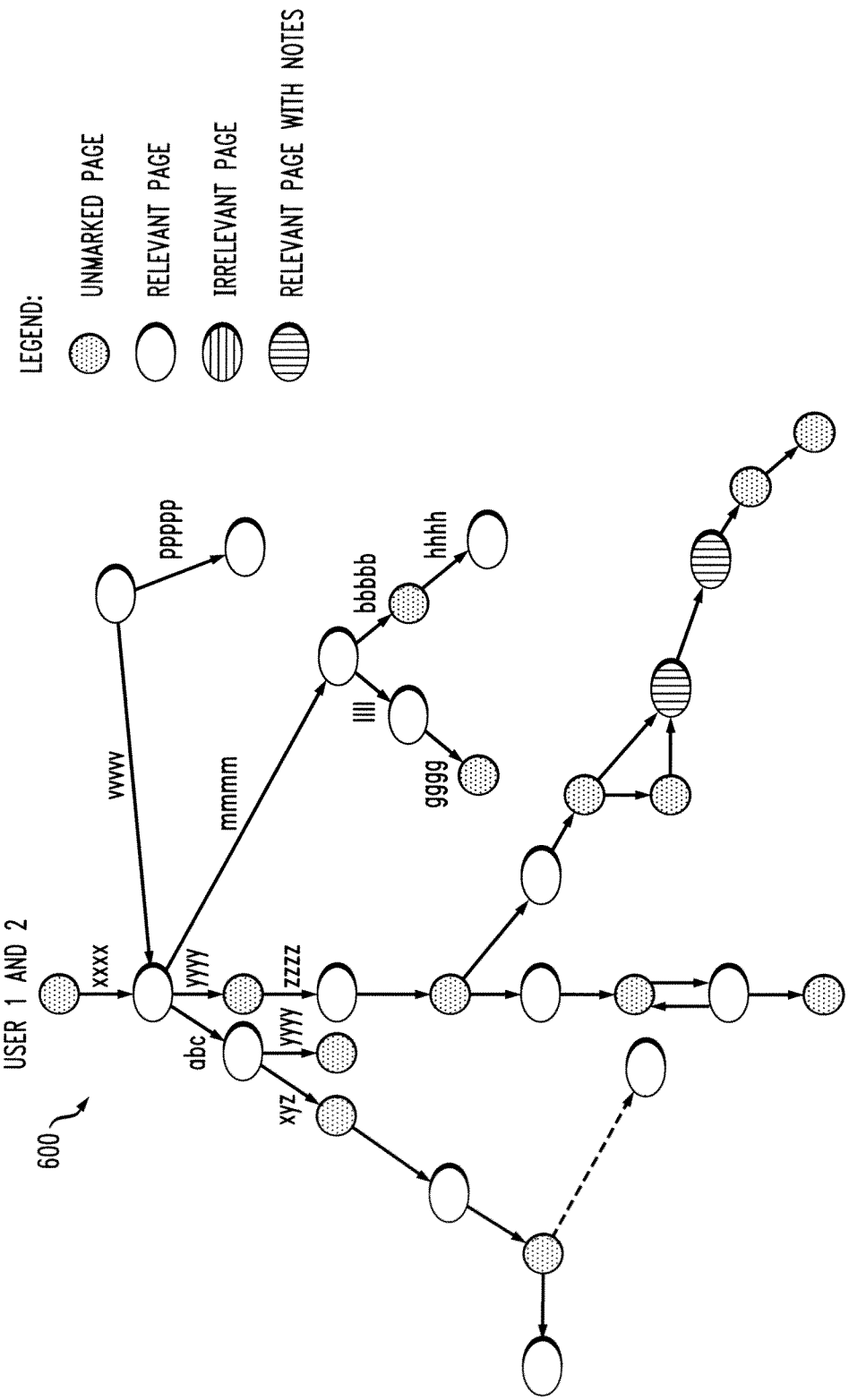

FIG. 6 illustrates a merged map 600 of the navigation maps 400 and 510 of FIG. 5. The merged map 600 can be employed by one or both of the users associated with maps 400 and 510, as well as any subscribers to the published maps. In this manner, these users can determine what other links could potentially be useful as discovered and rated by other users. Since the searches are not necessarily identical, giving a user someone else's navigation map alone may not be useful. However, if such a map is merged into the user's own map at a point of commonality, the search maintains its context and helps the user to see what other users have already discovered on the subject. For example, a new user can use a merged navigation map for self-enablement, to understand which links his or her co-workers have already rated as relevant or irrelevant in the pursuit of finding a solution, thus reducing the time needed to reach the target information.

In one exemplary embodiment, a common navigation map for a given keyword search query can be identified by tracking the commonalities of all published navigation maps to determine whether there are patterns across a large number of users trying to achieve similar goals (e.g., searching for similar keyword(s)). A navigation map and its associated annotations can be examined by a graph traversal algorithm to determine commonality, such as a Depth First Search. A graph matching algorithm, such as Least Mean Squares, can be employed to perform the graph comparison to help detect patterns. A common navigation map can be identified out of all of the collected maps and their associated annotations.

The status of nodes in the merged navigation map can be determined using one or more rules to resolve possibly conflicting relevance ratings by different users, as follows:

If a node is marked as relevant by a majority of users and unmarked by a minority of users, mark the node as relevant, otherwise leave the node as unmarked;

If a node is marked as relevant by some users and relevant with comments by other users, mark the node as relevant with comments and merge the comments;

If a node is marked as relevant by a majority of users and as irrelevant by a minority of users, mark the node as relevant, otherwise mark the node as irrelevant;

If a node is marked as unmarked by a majority of users and as irrelevant by a minority of users, mark the node as unmarked, otherwise mark the node as irrelevant;

If a node is marked as unmarked by a majority of users and as relevant with notes by a minority of users, mark the node as unmarked, otherwise mark the node as relevant with notes; and If a node is marked as irrelevant by a majority of users and as relevant with notes by a minority of users, mark the node as irrelevant, otherwise mark the node as relevant with notes.

As previously indicated, the links in a source web page that lead to a web page that has been marked as irrelevant can be disabled by dynamically updating the links in the source web page links based on the relevance rating determined after multiple graphs are merged and conflicts are resolved. The nodes in a navigation map that previous users have marked as irrelevant can thus be eliminated, disabled and/or otherwise highlighted.

Exemplary System and Article of Manufacture Details

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. FIG. 7 depicts an exemplary web navigation tool 700 that may be useful in implementing one or more aspects and/or elements of the present invention. With reference to FIG. 7, such an implementation might employ, for example, a processor 702, a memory 704, and an input/output interface formed, for example, by a display 706 and a keyboard 708. The memory 704 may store, for example, code for implementing the layout process 300 of FIG. 3.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Analog-to-digital converter(s) 720 may be provided to receive analog input, such as analog video feed, and to digitize same. Such converter(s) may be interconnected with system bus 710.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modem and Ethernet cards are just a few of the currently available types of network adapters.

Figure 7:
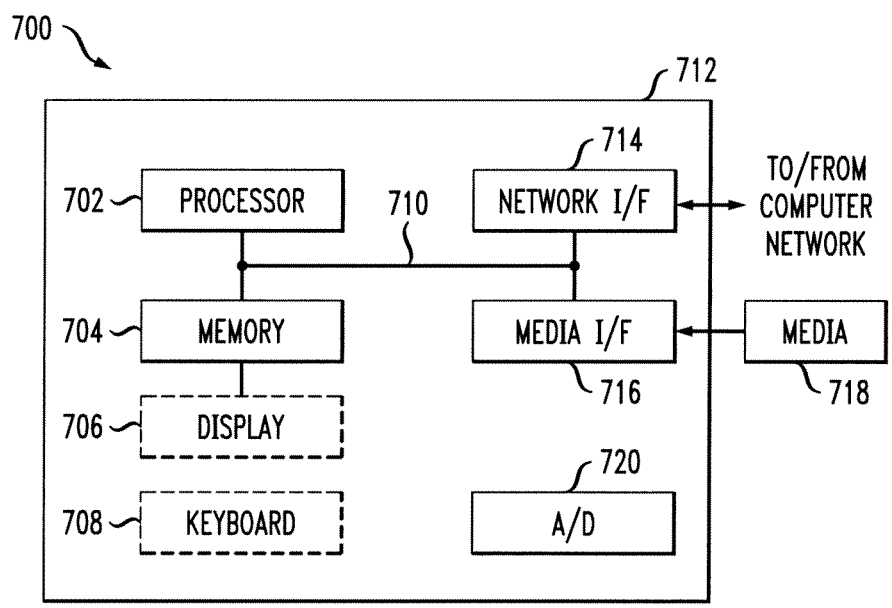
FIG. 7 depicts an exemplary web navigation tool that may be useful in implementing one or more aspects and/or elements of the present invention.

As used herein, including the claims, a "server" includes a physical data processing system (for example, system 712 as shown in FIG. 7) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 718 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 502. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for generating a navigation map, the apparatus comprising:
   a memory; and
   at least one hardware device, coupled to the memory, operative to:
   for a given web site visited by a user, store in a node for said given web site an address for said given web site, a relevance rating for said given visited web site indicating an importance of said given visited web site to a web navigation task of said user, and a link from said given visited web site to a next web site visited by said user;
   generate a navigation map comprised of said nodes for a plurality of said visited web sites, wherein each node in said navigation map corresponds to a given one of said given web sites visited by said user and is connected by an edge to at least one other node in said navigation map, wherein a presentation of at least one node in said navigation map is based on said relevance rating;
   merge a plurality of said navigation maps for a plurality of users, wherein each of said plurality of said navigation maps is comprised only of said nodes for said plurality of said visited web sites visited by said respective user, wherein each node in each of said navigation maps is connected by an edge to at least one other node in said respective navigation map, wherein said plurality of said navigation maps are merged from a common point by identifying nodes in said plurality of navigation maps corresponding to a same web page; and
   determine a relevance rating for a given node in said merged navigation map based on one or more conflict resolution rules that process a plurality of relevance ratings indicating whether or not said given visited web site associated with said given node is important to a web navigation task of said respective user to resolve conflicting relevance ratings of said given node by different users in said plurality of navigation maps, wherein said one or more conflict resolution rules determine a merged relevance rating for said given node that aggregates a plurality of said users marking said given node as relevant and a plurality of said users marking said given node as irrelevant, wherein said relevance rating of said given node by each user indicates a relevance said importance of said visited web site associated with given node to said web navigation task of said respective user.

2. The apparatus of claim 1, wherein said presentation comprises a visual indication of said relevance rating.

3. The apparatus of claim 1, wherein said presentation further comprises selectively including or excluding one or more nodes in said navigation map based on said relevance rating.

4. The apparatus of claim 1, wherein said at least one hardware device is further configured to selectively enable or disable one or more navigation links based on said relevance rating.

5. The apparatus of claim 1, wherein said at least one hardware device is further configured to add one or more bypass links to said navigation map based on said relevance rating.

6. The apparatus of claim 1, wherein said node further comprises a title of said given web site.

7. The apparatus of claim 1, wherein said at least one hardware device is further configured to obtain one or more annotations of said given web site from said user and store said annotations in said node for said given web site.

8. The apparatus of claim 1, wherein said at least one hardware device is further configured to process a keyword search of said nodes to identify said given web site in said navigation map.

9. The apparatus of claim 1, wherein said at least one hardware device is further configured to receive a designation of said navigation map as a public navigation map and make said navigation map available to at least one other user.

10. The apparatus of claim 1, wherein said plurality of navigation maps are merged by identifying navigation maps having similar search goals and a common node of a first of said identified navigation maps is rooted to a corresponding common node of a second of said identified navigation maps.

11. The apparatus of claim 1, wherein said relevance rating is one or more of provided by the user and discovered automatically by analyzing said navigation map.

12. The apparatus of claim 1, wherein said plurality of navigation maps are presented as corresponding directed graphs with each node in said directed graphs representing a visited web page, and wherein a label associated with an edge out of each node is a hypertext link that is clicked by one of said plurality of users to access the next web page.

13. A non-transitory machine-readable recordable storage medium for generating a navigation map, wherein one or more software programs when executed by one or more processing devices implement the steps of:
   for a given web site visited by a user, storing in a node for said given web site an address for said given web site, a relevance rating for said given visited web site indicating an importance of said given visited web site to a web navigation task of said user, and a link from said given visited web site to a next web site visited by said user;
   generating a navigation map comprised of said nodes for a plurality of said visited web sites, wherein each node in said navigation map corresponds to a given one of said given web sites visited by said user and is connected by an edge to at least one other node in said navigation map, wherein a presentation of at least one node in said navigation map is based on said relevance rating;
   merging a plurality of said navigation maps for a plurality of users, wherein each of said plurality of said navigation maps is comprised only of said nodes for said plurality of said visited web sites visited by said respective user, wherein each node in each of said navigation maps is connected by an edge to at least one other node in said respective navigation map, wherein said plurality of said navigation maps are merged from a common point by identifying nodes in said plurality of navigation maps corresponding to a same web page ; and determining a relevance rating for a given node in said merged navigation map based on one or more conflict resolution rules that process a plurality of relevance ratings indicating whether or not said given visited web site associated with said given node is important to a web navigation task of said respective user to resolve conflicting relevance ratings of said given node by different users in said plurality of navigation maps, wherein said one or more conflict resolution rules determine a merged relevance rating for said given node that aggregates a plurality of said users marking said given node as relevant and a plurality of said users marking said given node as irrelevant, wherein said relevance rating of said given node by each user indicates a relevance said importance of said visited web site associated with given node to said web navigation task of said respective user.

14. The tangible machine-readable recordable storage medium of claim 13, wherein said plurality of navigation maps are merged by identifying navigation maps having similar search goals and rooting a common node of a first of said identified navigation maps to a corresponding common node of a second of said identified navigation maps.

15. The tangible machine-readable recordable storage medium of claim 13, wherein said relevance rating is one or more of provided by the user and discovered automatically by analyzing said navigation map.

16. The tangible machine-readable recordable storage medium of claim 13, wherein said plurality of navigation maps are presented as corresponding directed graphs with each node in said directed graphs representing a visited web page, and wherein a label associated with an edge out of each node is a hypertext link that is clicked by one of said plurality of users to access the next web page.

17. The apparatus of claim 1, wherein said plurality of said navigation maps comprise a plurality of directed navigation maps.

18. The apparatus of claim 1, wherein said plurality of said navigation maps comprise said nodes only for said plurality of said visited web sites.

* * * * *